United States Patent Office 3,544,493
Patented Dec. 1, 1970

3,544,493
ADHESIVE COMPOSITIONS OF IMPROVED PRE-PRESS PROPERTIES COMPRISING HIGH AMYLOPECTIN STARCH
Clyde H. Sheppard, Bellevue, Wash., assignor to Monsanto Company, St. Louis, Mo., a corporation of Delaware
No Drawing. Continuation-in-part of application Ser. No. 539,644, Apr. 4, 1966. This application Jan. 21, 1969, Ser. No. 792,803
Int. Cl. C08g *37/14*
U.S. Cl. 260—17.2                                  7 Claims

ABSTRACT OF THE DISCLOSURE

An aqueous alkaline thermosetting adhesive composition having improved pre-press properties for plywood manufacture which comprises an aqueous alkaline phenolic resin containing less than 5% residual free formaldehyde, an alkali metal hydroxide, a filler, and a starch comprising at least about 75% based upon total starch units of amylopectin units, said starch having been pre-treated by contact with alkali metal hydroxide prior to combination with the bulk of the phenolic resin.

RELATED APPLICATION

This application is a continuation-in-part of co-pending application Ser. No. 539,644, filed Apr. 4, 1966 and, now abandoned.

BACKGROUND

This application relates to resinous adhesive compositions. More particularly, it relates to aqueous alkaline phenol-formaldehyde resin adhesive compositions containing certain alkaline pre-treated starches.

In the manufacture of plywood, wooden veneers are coated with an adhesive composition and then assembled or laid-up into a plurality of veneers, e.g., 5-ply, comprising what is termed a plywood assembly. Mills conventionally stack a large number of these assemblies into a pile and then place the pile under an initial cold compression, called pre-press, in order to effect an initial adhesive bond between the adjacent veneers in each plywood assembly so that each assembly may be handled in further processing operations without disrupting the alignment of the veneers comprising the assembly. The time elapsed from assembly of the veneers until the pre-press is commonly referred to as the stand time. The presently available adhesive compositions require a relatively lengthy stand time and pre-press time in order to achieve acceptable pre-press bond strengths. Adhesive compositions are continuously being sought which will reduce the necessary stand time and pre-press time associated with developing satisfactory pre-press bond strength and, at the same time, maintain satisfactory total assembly time tolerance; assembly time being defined to mean the total time elapsed from starting to lay-up the plywood assemblies until final hot-pressing, and includes both the stand time and pre-press time as well as the normal panel-handling time. Assembly time tolerance and pre-press bond strength are inversely related and the problem of increasing the pre-press bond strength without severely limiting the assembly time tolerance becomes extremely difficult. With regard to the relation of assembly time tolerance to pre-press bond strength, both the stand time and press cycle portions of the total assembly time are significant in length and should be shortened in time.

It has been known for some time in the plywood industry that both assembly time and pre-press performance characteristics of phenolic adhesives are directly related to the ability of the extenders and/or phenolic resins to effectively retain or lose water. The assembly time performance is attributed primarily to the ability of the mixed adhesive to retain fluidity, whereas pre-press is generally related to its ability to lose water rapidly. Until now, these contradictory factors have tended to discourage the use of phenolic pre-press adhesives for plywood because they have seriously curtailed assembly time limits. Numerous formulations are presently available that provide adequate assembly times, but lack commercially satisfactory pre-press characteristics. On the other hand, there are relatively few operating pre-press formulations because of their restrictively short assembly time tolerance. In each case, one of these performance properties has had to be compromised in order to obtain a high level of the other.

SUMMARY

This invention relates to an effective solution to this problem. It was found that after alkaline treatment or dispersion, certain starches containing unusually high percentages of amylopectin units contributed significantly greater improvement in the ability of the adhesive to retain sufficient fluidity for good assembly time tolerance, while still performing well as a pre-press adhesive. In accomplishing the above balance between assembly time and pre-press properties, the curing mechanism of the phenolic resin appears little affected.

It is an object of this invention to provide novel adhesive compositions.

Another object is the provision of novel adhesive compositions having improved pre-press properties, particularly at short stand times.

Another object is the provision of adhesive compositions having improved pre-press properties and comprising certain starch modified phenol-formaldehyde resins.

These and other objects are attained through the alkaline pre-treatment of starches containing at least about 75% by weight of amylopectin units, based upon total starch constituents, as a preliminary step in conventional phenol-formaldehyde resin adhesive formulation.

The adhesives produced in this manner differ quite radically from the presently available starch modified adhesives. With presently available starch modified adhesives, the proper dispersion of the starch constituent is not critical with respect to alkaline level, temperature, mixing speed, starch-water ratio and mixing time. In fact, due to the nature of the cereal grain starches themselves, controlled changes in dispersing conditions often do not yield predictable effects on certain useful properties of the finished adhesives. In this invention, there is ample evidence that the above factors are critical in the treatment of the high amylopectin starch, yielding significant and predictable changes in several useful adhesive performance properties.

The second difference is the ability of these treated high amylopectin starches to give even the fast-curing adhesives an excellent balance of contradictory performance properties; i.e., long assembly time tolerance and pre-press efficiency (rapid development of a strong bond).

The third difference is the ability of these novel adhesive preparations to impart a useful level of pre-press capability to virtually any phenolic plywood resin. Until now, there has been a very positive correlation between resin advancement and pre-press efficiency. A certain fairly high lever of advancement was required in order to obtain pre-press bonds at all. Using the method and composition of this invention, the degree of advancement which resins must have for pre-pressing is greatly reduced. This has permitted including even the so-called "long flow" phenolic resins with their unique capacity for long assembly times. The only present exception appears to be phenolic resins containing a high level of free formaldehyde, e.g., above 5% free formaldehyde based upon resin solids, which alters the starch dispersion and reduces its effectiveness.

This invention realtes to the formulation of starch modified aqueous alkaline phenol-formaldehyde condensate adhesive compositions wherein the starch used has a high amylopectin content and which is at least partially pretreated with an alkali metal hydroxide prior to admixture with the bulk of the phenolic resin.

For the purpose of this invention, a high amplopectin content starch is defined as raw, semi-refined, or refined starch from one of the very limited natural sources yielding starchy constituents which assay at least about 75% amylopectin units (as opposed to amylose units) in their molecular structure. Exemplary of the more usual sources of high amylopectin starches are potatoes, yams, sweet potatoes, amnioc (i.e., tapioca or cassava), sago and waxy maize (amioca). Unrefined or semi-refined starches are usually preferred because their structure has undergone a minimum of mechanical degradation. Thus their potential viscosity and consistency contributions to adhesive working properties are at the highest levels attainable.

The behavior of starches on aqueous solution and alkaline dispersion is largely governed by their molecular configuration. Highly branched or amylopectin starch molecules are generally larger and heavier, disperse more readily, develop higher viscosity in aqueous solution, remain stable longer and appear to lose water somewhat more readily under certain conditions of applied force than their straight-chain counterparts. The straight-chain portions of starch molecules are characterized as amylose units; the branched chain portions as amylopectin units. Thus the higher the amylopectin content, the gerater the proportion of branch structure and the more suitable the starch will be for today's high performance phenolic plywood adhesives.

The phenolic resin employed may be any of the aqueous alkaline phenol-formaldehyde condensates, provided that the free formaldehyde content does not exceed 5% based upon resin solids. Phenol is the preferred phenolic constituent of the phenolic resin. However, up to 15% by weight of the phenol may be replaced with other phenolic constituents such as the cresols, xylenols and certain polyphenyl phenols which occur in still bottoms in the distillation purification of phenol or vanillin. Commercially available phenol fractions may also be used. The formaldehyde empolyed may be substantially pure or it may be a commercially avaliable aqueous solution thereof. For practical reasons, Formalin, i.e., either 37% or 50% aqueous formaldehyde, is usually employed. Methanol, a polymerization inhibitor added to stabilize against polymerization to paraformaldehyde in storage, may be present in the formaldehyde.

Any of the alkali metal hydroxides or mixtures thereof may be employed in the practice of this invention. These include sodium hydroxide, lithium hydroxide, potassium hydroxide, rubidium hydroxide and cesium hydroxide. Generally, such are employed in aqueous solution.

Conventional fillers employed in adhesive compositions may be used in the practice of this invention. Such fillers include clay, talc, whiting, calcite, etc., cellulosic materials such as wood flour, ground corn cobs, Furafil, certain fractions of bark flour, nut shell flour such as walnut shell flour, the endocarps of drupes such as apricots, peach and prune, etc., peat, etc. In a preferred embodiment, however, the filler employed in Furafil which is defined as a solid furfural by-product residue from the acid hydrolysis of a pentosan-containing material such as ground oat hulls or ground corn cobs. Furafiil is more completely descirbed in U.S. 2,727,869.

In the practice of this invention, the high amylopectin starch is first combined with from 2-20% by weight, based on the weight of the starch, of an alkali metal hydroxide in the presence of water. The quantity of water employed is predicated upon consistency requirements for proper mixing within the skill of the art and the intended solids content of the final adhesive composition. (Normally, such adhesive compositions when completed contain from 10 to 70% solids by weight and preferbaly from about 35–45% solids by weight.) In a preferred embodiment, at least 50% of the total water ultimately to be charged is combined with the high amylopectin starch and the alkali metal hydroxide during this pre-treatment step. The greater the amount of the total water which is charged during this pre-treatment step, up to the total required in a given adhesive formulation, the greater will be the swelling of the pre-treated high amylopectin starch with an associated maximization of assembly time tolerance. If desired, though less preferable, up to 15% by weight of the total phenolic resin to be added may be present during this pre-treatment in order to maintain batch fluidity. In such case, it may be found desirable to somewhat lengthen the pre-treatment mixing gap.

Within the broad parameters discussed in the preceding paragraph, three variables have been found to interact in the pretreatment step, allowing manipulation to adapt the adhesive formulation to varying mill conditions. These variables are mixing time, temperature and alkali metal hydroxide concentration. While it is not feasible to set numerical limits on the time and temperature variables, those skilled in the art will comprehend their utilization by the observation that the interactions follow the expected and predictable pattern i.e., that the dispersed viscosity of the pre-treated high amylopectin starch increases with increasing water temperature, mixing time and alkali metal hydroxide, always to a higher and more stable state at each step or condition than it is possible to attain with lower amylopectin content starches; of cereal grain origin, for instance. Thus, in mill practice, low winter water temperatures can be compensated for by increasing either or both of mixing time and alkali metal hydroxide level. In summer, when water sources are warm, a decrease in either or both of mixing time and alkali metal hydroxide level can be employed. The use of pre-heated water would enable even further cutting of mixing time and/or alkali metal hydroxide level. More conventional starch modified adhesives available to date do not provide this flexibility.

Following the alkaline pre-treatment, the phenolic resin, and optionally additional filler and alkali metal hydroxide, if any is required, and such further water as may be desired are charged in any desired sequence according to conventional practices in the art. The final composition will contain from 5–50 parts by weight of high amylopectin starch, from 5–25 parts by weight of alkali metal hydroxide, from 25–125 parts by weight of filler, all per 100 parts by weight of phenolic resin solids.

Other conventional additives may be incorporated into the adhesive compositions of this invention. Such conventional additives are used in the judgment of the operator and include extenders, hardening agents, antifoaming agents, buffer salts, dyes, etc.

EMBODIMENTS

The following examples are presented in illustration of this invention and are not intended as limitations thereof. Where parts are mentioned, they are parts by weight.

Examples I–V, infra, represent the practice of this invention and a low amylopectin cereal grain starch control, respectively. In these examples, the proportions of water and the Furafil extender differ only slightly so as to attain substantially equal adhesive viscosities; thus minimizing the effect upon the later reported results of this rather important variable. Examples VI–VII, following, show the use of these adhesive formulations in fabricating plywood and their performance evaluation, the results being tabulated in Tables A–C.

EXAMPLE I

This example represents the use of unrefined potato starch which contains about 78% amylopectin units based upon total starch units. Furafil 100 is a particulate residue remaining after the acid hydrolysis of pentosan-containing mixture of corn cobs and oat hulls (see U.S. 2,727,869) substantially all of which passes through a screen of U.S. Sieve size No. 100. The phenolic resin used is an aqueous alkaline phenolic resin containing about 40% solids by weight, having a 70° F. viscosity of about 102 on the MacMichael #26d wire (see U.S. 2,437,981 for description of this viscosity index) and prepared by condensing 1.0 molar proportion of phenol with about 2.0 molar proportions of formaldehyde in an aqueous medium in the presence of about 0.75 molar proportions of sodium hydroxide added in three increments of 0.15, 0.30 and 0.30 molar proportion each.

|  | Parts |
|---|---|
| Water (at 65–75° F.) | 597 |
| Furafil 100 extender | 235 |
| Unrefined potato starch mix 2 minutes | 57 |
| Phenolic resin, aqueous mix 2 minutes | 136 |
| 50% aqueous NaOH mix 25 minutes | 60 |
| Phenolic resin, liquid mix 5 minutes | 1221 |

The resulting adhesive has a 70° F. viscosity of about 24 on the MacMichael #26s wire.

EXAMPLE II

This example represents the use of unrefined potato starch according to another practice of this invention. Unrefined potato starch contains about 78% amylopectin units based upon total starch units. The aqueous alkaline phenolic resin of Example I is used.

|  | Parts |
|---|---|
| Water (at 65–75° F.) | 522 |
| Unrefined potato starch mix 3 minutes | 57 |
| 50% aqueous NaOH mix 15 minutes | 10 |
| Water (at 65–75° F.) | 65 |
| Furafil 100 extender | 245 |
| 50% aqueous NaOH mix 25 minutes | 50 |
| Phenolic resin, aqueous mix 5 minutes | 1357 |

The resulting adhesive has a 70° F. viscosity of about 29 on the MacMichael #26s wire.

EXAMPLE III

This example represents the use of unrefined yam starch, which contains about 78% by weight of amylopectin units based upon total starch units, according to the practice of this invention. The aqueous alkaline phenolic resin of Example I is used.

|  | Parts |
|---|---|
| Water (at 65–75° F.) | 435 |
| Unrefined yam starch | 48 |
| 50% aqueous NaOH mix 15 minutes | 8 |
| Water (at 65–75° F.) | 54 |
| Furafil 100 extender | 205 |
| 50% aqueous NaOH mix 25 minutes | 33 |
| Phenolic resin, liquid mix 5 minutes | 1130 |

The resulting adhesive has a 70° F. viscosity of about 26 on the MacMichael 26s wire.

EXAMPLE IV

This example represents the use of waxy maize, which contains about 99% of amylopectin units based upon total starch units, according to the practice of this invention. The aqueous alkaline phenolic resin of Example I is used.

|  | Parts |
|---|---|
| Water (at 65–75° F.) | 435 |
| Waxy maize starch | 48 |
| 50% aqueous NaOH mix 15 minutes | 8 |
| Water (at 65–75° F.) | 54 |
| Furafil 100 extender | 205 |
| 50% aqueous NaOH mix 25 minutes | 33 |
| Phenolic resin, liquid mix 5 minutes | 1130 |

The resulting adhesive has a 70° F. viscosity of about 31 on the MacMichael 26s wire.

EXAMPLE V

This example represents the use of wheat flour, an unrefined cereal grain starch containig about 70% amylopectin units, based upon total starch units, as a control. The aqueous alkaline phenolic resin of Example I is used.

|  | Parts |
|---|---|
| Water (at 65–75° F.) | 597 |
| Furafil 100 extender | 200 |
| Wheat flour mix 2 minutes | 57 |
| 50% aqueous NaOH mix 20 minutes | 60 |
| Phenolic resin, liquid mix 2 minutes | 136 |
| Furafil 100 extender mix 2 minutes | 35 |
| Phenolic resin, liquid mix 5 minutes | 1221 |

The resulting adhesive has a 70° F. viscosity of about 25 on the MacMichael 26s wire.

EXAMPLE VI

The adhesive compositions of Example I–V are evaluated for their pre-press properties by laying up 2-ply cross-lap test panels and pulling them apart on a laboratory puller equipped with gripping means and a scale for measuring the pounds of pull. A 7/32″ Douglas fir veneer is cut into a series of 4⅞″ by 5⅞″ test plies. Pairs of test plies are selected and one surface of one ply from each pair is coated with 60 pounds per MDGL (thousand square feet of double glue line) of the selected adhesive composition. The second ply is then placed across the coated surface of the first ply with its grain running at a 90° angle to the grain of the first ply and with the long dimension of each ply overlapping the short dimension of the other ply on two sides. A series of five 2-ply assemblies are made with each adhesive composition, stacking the five assemblies and placing on top of the uppermost assembly a brick which provides a weight per unit area equivalent to that of assembled veneers awaiting pre-pressing in a plywood mill. Each assembly is permitted to remain in this stack for a pre-determined period of time (herein defined as the "stand time" before pre-press) prior to cold pre-pressing at 70° F. and 98 p.s.i. pressure for a designated period of time (herein defined as "pre-press time"). Each pre-pressed assembly is then broken, on a laboratory puller having a fixed base jig under which the overlapping ends of one ply are placed and a second, movable jig attached to a scale under which the overlapping ends of the second ply are placed, by pulling apart, using a load rate of about 10 pounds per second, recording the pounds of pull at the break for each assembly and subsequently examining each assembly to determine the percentage of wood failure at break. The results obtained are recorded in Tables A and B, infra.

TABLE A.—STRENGTH OF PRE-PRESSED BOND

| Stand time (minutes) | Pre-press time (minutes) | Pounds pull-bond strength of adhesive of— | | | | |
|---|---|---|---|---|---|---|
| | | Ex. I | Ex. II | Ex. III | Ex. IV | Ex. V |
| 2 | 4 | 20 | 55 | 72 | 50 | 7 |
| 7 | 5 | 85 | 105 | 105 | 95 | 35 |
| 15 | 5 | 120 | 150 | 150 | 140 | 75 |
| 22 | 5 | 180 | 180 | 200 | 190 | 90 |
| 30 | 5 | 190 | 200 | 200 | 200 | 110 |

TABLE B.—WOOD FAILURE ON BREAK

| Stand time (minutes) | Pre-press time (minutes) | Percent wood failure of adhesive of— | | | | |
|---|---|---|---|---|---|---|
| | | Ex. I | Ex. II | Ex. III | Ex. IV | Ex. V |
| 2 | 4 | 0 | 0 | 0 | 0 | 0 |
| 7 | 5 | 0 | Trace | 0 | 0 | 0 |
| 15 | 5 | Trace | Trace | 5 | Trace | 0 |
| 22 | 5 | Trace | 10 | 10 | 10 | Trace |
| 30 | 5 | 10 | 20 | 25 | 20 | 5 |

The results in Table A show that the compositions and method of this invention result in a quicker development of a good pre-press bond as evidenced by the higher strengths at the shorter stand times, thus achieving the desired objectives of this invention. Note the excellent strengths, however, at all stand-times in Exs. I–IV as opposed to the control Ex. V.

The percent wood failure test measures the strength of the glue bond developed in relation to the strength of the veneer surrounding the glue line. Since a good pre-press bond is only that required to enable handling of the assembled veneers prior to full cure under subsequent hot-pressing, it is not necessary that a pre-press bond achieve any substantial part of the full 90–100% wood failure of the finished hot-pressed plywood panel. The results shown in Table B, however, provide further evidence of the rapid development of good pre-press bonds achieved through practice of this invention. It is interesting to note the higher wood failure attained at even the long 30 minute assembly time where one would expect the control sample (Ex. V) to match the performance of the adhesives of Examples I–IV. This demonstrates that this invention not only meets the desired objective of quickly developing a good pre-press bond but that it also develops a stronger ultimate pre-press bond regardless of assembly time used.

EXAMPLE VII

The Example is provided to show the comparative properties of the adhesives of Examples I–V when used under both short and long assembly time conditions on a difficult wood, i.e., overdried veneer having a moisture content of only 1.0–2.0% by weight.

PART A

Five-ply 13/16" Douglas fir plywood panels are prepared using overdried Douglas fir veneers and a glue spread of 65 pounds per MDGL (thousand square feet of double glue line) at assembly times shown in Table C, hot-pressing the panels at 175 p.s.i. and 300° F. for 6½ minutes. Each panel is then tested for dry, boil, and vacuum/pressure shear strength, measuring both the breaking load and the percent wood failure.

PART B

Specimens for shear strength evaluation are prepared by first cutting a 3⅛" x 10" section from each panel; each section being cut so that the grain of the face plies is oriented parallel to the long axis. Each section is then grooved along a line ½" from the long axis, and parallel thereto, to a depth extending ⅔ through the center ply. A second and similar groove is cut parallel thereto upon the opposite face of each section such that the distance between the grooves is exactly 1". After grooving, each section is cut across the long axis to yield a number of specimens measuring 1" x 3⅛" and having a shear area of one square inch located in the center. For each of the dry, boil and vacuum/pressure shear tests, six of the specimens cut from each section are broken under a loading rate of about 600 pounds per minute on a standard hydraulic plywood testing machine and the average breaking load and percent wood failure for each set of 6 specimens is determined.

PART C

The specimens to be tested for dry shear strength require no pre-treatment. Those tested for boil shear strength are pre-treated by immersing them in boiling water for 4 hours, drying at 145±5° F. for 20 hours, and finally boiling again for another 4 hours. The specimens to be tested for vacuum/pressure shear strength are pre-treated by immersing in water at 70±2° F. in a pressure vessel, applying first a vacuum of 25±2 inches of mercury for 30 minutes and next a pressure of 70 p.s.i. for 30 minutes. The boil and vacuum/pressure shear test specimens are broken while still wet.

The test results for each of the adhesives of Examples I–V are summarized in Table C. In interpreting these results a wood failure of 0% indicates that failure occurs entirely within the glue line. Conversely, a wood failure of 100% indicates that the glue line is uniformly stronger than the wood within the shear area of the center ply. Obviously, a plywood adhesive should show a high wood failure, at least on dry shear. Similarly, a water-resistant plywood adhesive should show appreciable wood failure under the boil and vacuum/pressure tests.

TABLE C

| Adhesive employed | Stand time (minutes) | Breaking load (p.s.i.) and percent wood failure | | | | | |
|---|---|---|---|---|---|---|---|
| | | Dry shear | | Boil shear | | Vac./press shear | |
| | | P.s.i. | percent | P.s.i. | percent | P.s.i. | percent |
| Ex. I | 3 | 255 | 99 | 210 | 100 | 241 | 100 |
| Ex. II | 3 | 361 | 97 | 300 | 96 | 351 | 100 |
| Ex. III | 3 | 227 | 95 | 211 | 98 | 260 | 100 |
| Ex. IV | 3 | 257 | 100 | 198 | 100 | 216 | 99 |
| Ex. V | 3 | 121 | 95 | 123 | 98 | 123 | 91 |
| Ex. I | 10 | 248 | 99 | 203 | 100 | 230 | 99 |
| Ex. II | 10 | 340 | 97 | 241 | 100 | 313 | 98 |
| Ex. III | 10 | 218 | 100 | 227 | 100 | 257 | 99 |
| Ex. IV | 10 | 250 | 100 | 191 | 100 | 207 | 100 |
| Ex. V | 10 | 288 | 96 | 251 | 93 | 148 | 100 |
| Ex. I | 20 | 291 | 100 | 201 | 100 | 231 | 100 |
| Ex. II | 20 | 347 | 100 | 220 | 98 | 265 | 96 |
| Ex. III | 20 | 215 | 100 | 221 | 99 | 250 | 100 |
| Ex. IV | 20 | 237 | 100 | 165 | 99 | 321 | 100 |
| Ex. V | 20 | 270 | 92 | 145 | 83 | 208 | 92 |
| Ex. I | 30 | 253 | 100 | 145 | 98 | 165 | 100 |
| Ex. II | 30 | 300 | 98 | 217 | 95 | 250 | 98 |
| Ex. III | 30 | 197 | 98 | 163 | 100 | 197 | 100 |
| Ex. IV | 30 | 328 | 100 | 298 | 100 | 191 | 100 |
| Ex. V | 30 | 243 | 95 | 251 | 82 | 117 | 90 |

Study of Table C shows that plywood panels prepared using the adhesive compositions of this invention (Examples I–IV) exhibit superior strength at long assembly times reported as opposed to the control, Example V. The difference between the control and examples representing practice of this invention starts to show on longer stand times under boil shear and vac./press shear which simulate outdoor exposure. The 20 and 30 minute stand time results for Example V would not pass American Plywood Association boil shear tests for exterior plywood approval; 90% average wood failure being the minimum acceptable for this test.

It is obvious that many variations may be made in the products and processes set forth above without departing from the spirit and scope of this invention.

What is claimed is:

1. An aqueous alkaline thermosetting phenolic resin based adhesive composition having improved pre-press properties which comprises (1) 100 parts by weight, on a solids basis, of an aqueous alkaline phenol-formaldehyde condensate containing less than 5% residual free formaldehyde based upon resin solids, (2) from 5–25 parts by weight of an alkali metal hydroxide, (3) from 5–50 parts by weight of starch containing at least about 75% amylopectin units based upon total starch units, and (4) from 25–125 parts by weight of conventional adhesive filler; said starch having been pre-treated by contact with alkali metal hydroxide prior to combination thereof with more than 15% by weight of the total aqueous alkaline phenolformaldehyde condensate present.

2. An aqueous alkaline thermosetting phenolic resin based adhesive composition as in claim 1 wherein the starch component is unrefined potato starch.

3. An aqueous alkaline thermosetting phenolic resin based adhesive composition as in claim 1 wherein the starch component is unrefined yam starch.

4. An aqueous alkaline thermosetting phenolic resin based adhesive composition as in claim 1 wherein the starch component is waxy maize starch.

5. An aqueous alkaline thermosetting phenolic resin based adhesive composition as in claim 1 wherein the conventional adhesive filler is a solid furfural by-product residue from the acid hydrolysis of a pentosan-containing material selected from the group consisting of ground oat hulls and ground corn cobs.

6. An aqueous alkaline thermosetting phenolic resin based adhesive composition having improved pre-press properties which comprises (1) 100 parts by weight, on a solids basis, of an aqueous alkaline phenol-formaldehyde condensate containing less than 5% residual free formaldehyde based upon resin solids, (2) from 5–25 parts by weight of an alkali metal hydroxide, (3) from 5–50 parts by weight of starch containing at least about 75% amylopectin units based upon total starch units, and (4) from 25–125 parts by weight of conventional adhesive filler; said starch having been pre-treated by contact with alkali metal hydroxide prior to combination with the phenol-formaldehyde condensate.

7. In the preparation of a starch modified aqueous alkaline phenol-formaldehyde resin adhesive composition, the improvement which comprises the use, as the starch component, of an at least partially alkaline pre-digested starch containing at least about 75% amylopectin units based upon total starch units.

References Cited

UNITED STATES PATENTS

| 2,141,313 | 12/1938 | Osgood et al. | 260—17.2 |
| 2,626,934 | 1/1953 | Kesler | 260—17.2 |
| 2,650,205 | 8/1953 | Kesler et al. | 260—17.2 |
| 3,074,897 | 1/1963 | Baker | 260—17.2 |

FOREIGN PATENTS

| 219,550 | 12/1958 | Australia | 260—17.2 |

WILLIAM H. SHORT, Primary Examiner

E. WOODBERRY, Assistant Examiner

U.S. Cl. X.R.

161—262